No. 870,438. PATENTED NOV. 5, 1907.
A. JOHNSON.
COMBINED HOT AND COLD WATER FAUCET.
APPLICATION FILED JAN. 26, 1907.
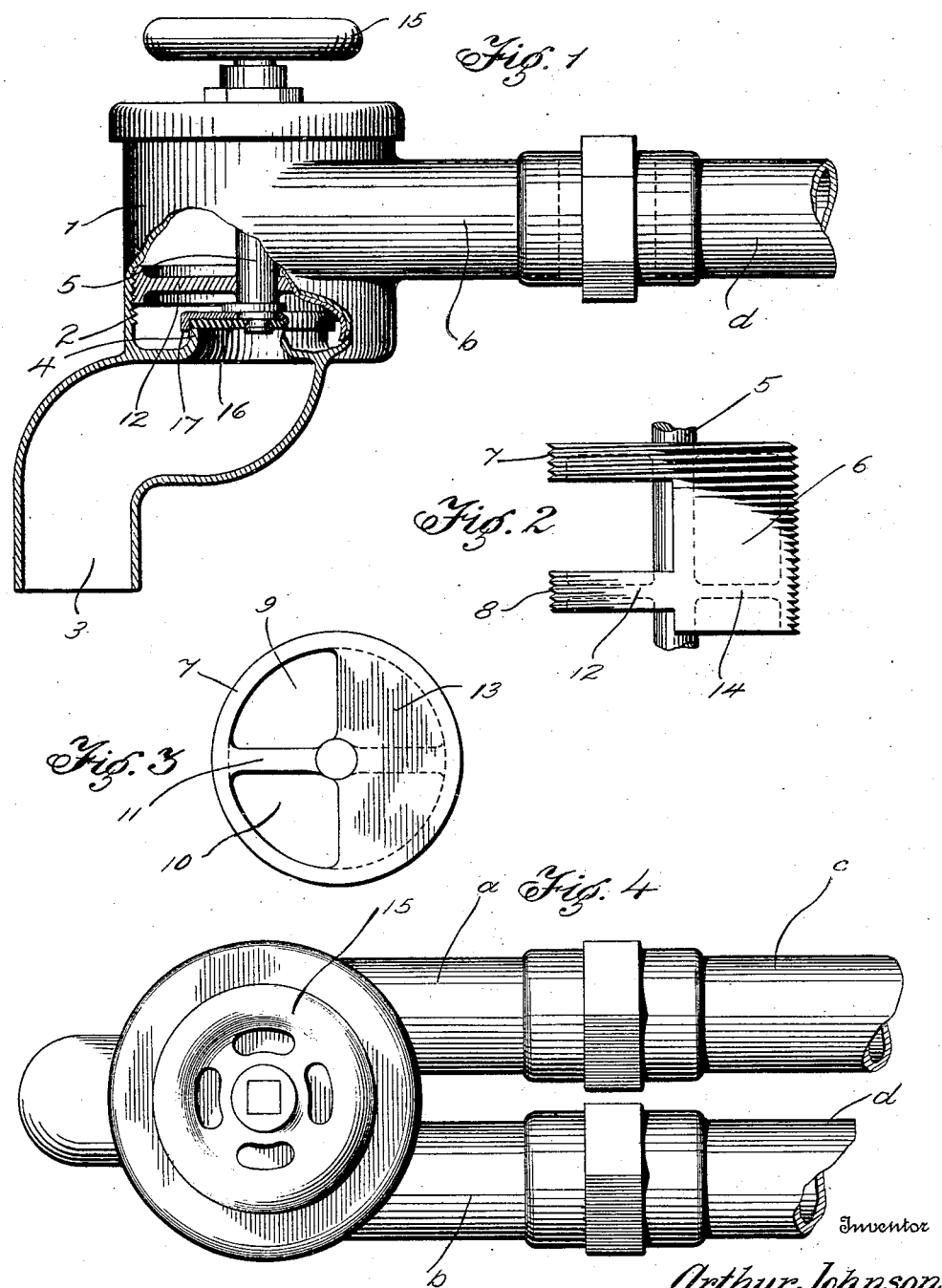

UNITED STATES PATENT OFFICE.

ARTHUR JOHNSON, OF HYDE PARK, MASSACHUSETTS.

COMBINED HOT AND COLD WATER FAUCET.

No. 870,438.  Specification of Letters Patent.  Patented Nov. 5, 1907.

Application filed January 26, 1907. Serial No. 354,322.

*To all whom it may concern:*

Be it known that I, ARTHUR JOHNSON, a citizen of the United States of America, residing at Hyde Park, in the county of Norfolk and State of Massachusetts, have invented new and useful Improvements in Combined Hot and Cold Water Faucets, of which the following is a specification.

This invention relates to a combined hot and cold water faucet, and one of the principal objects of the same is to provide a faucet of simple construction designed to be attached to a hot and a cold water supply pipe, and means whereby either hot or cold water may be discharged through the single outlet nozzle.

Another object of my invention is to provide a faucet of simple construction in which a single valve is employed, and a single outlet nozzle, and in which the valve may be turned to permit the discharge of either hot or cold water when properly connected to the supply pipes.

The foregoing and other objects may be attained by means of the construction illustrated in the accompanying drawings, in which:

Figure 1 is a side elevation and partial section of a combined hot and cold water faucet made in accordance with my invention. Fig. 2 is a side elevation of a valve regulator. Fig. 3 is a plan view of the same. Fig. 4 is a plan view of the faucet shown connected up to a hot water and a cold water supply pipe.

Referring to the drawing for a more particular description of my invention, the numeral 1 designates a cylinder having an interior threaded portion 2 and an outlet nozzle 3 extending from the lower end or bottom thereof. Projecting upward from the upper end of the nozzle 3 is a valve seat 4. Secured to a valve stem 5 is a threaded regulator 6, said regulator comprising an upper and lower threaded ring 7, 8, spaced apart as shown in Fig. 2 and provided with interior openings 9, 10, as shown in Fig. 3, said openings being divided by a central spoke 11. The ring 8 is provided with similar openings divided by a central partition or spoke 12, shown in dotted lines in Fig. 2, said openings in the ring 8 being arranged coincidently with the openings 9 and 10. A semi-circular disk or cover 13, 14 is formed integral with the rings 7 and 8, and covers approximately one-half of said rings. This regulator is rigidly secured to the stem 5 and upon the upper end of said stem, a hand wheel 15 is fitted. On the lower end of the stem a leather or rubber gasket 16 is secured in any suitable manner, and a cap 17 provided with an annular flange to fit over the valve seat 4 is connected to the stem 5 above the gasket 16. Intake pipes *a*, *b* communicate with the cylinder 1 at a point between the rings 7 and 8 and in line with the solid central portion of the regulator 6, and connected to said intake pipes are a hot water supply pipe *c* and a cold water supply pipe *b*, as shown in Fig. 4.

The operation of my faucet may be briefly described as follows: The hand wheel 15 being turned in a direction to move the regulator 6 upward to unseat the valve and dispose one of the openings 9 or 10 in line with either the hot water pipe or the cold water pipe, will permit the water to flow through the outlet nozzle 3. Should it be required to temper the hot water for bathing purposes, the openings 9 and 10 may be disposed in a position to permit both hot and cold water to flow through the pipes as will be understood.

From the foregoing it will be obvious that a faucet made in accordance with my invention is of simple construction, may be quickly applied to the hot and cold water pipes, can be readily operated to permit either hot or cold water or tempered water to flow through the nozzle 3.

My invention may be manufactured at slight cost, is composed of comparatively few parts which cannot readily get out of order, and access may be readily had to the interior of the cylinder for repairs and renewals.

Having thus described the invention, what I claim is:

1. A faucet of the character described comprising an internally threaded cylinder having an outlet nozzle in the bottom thereof, a valve seat in the upper portion of said nozzle, a regulator comprising spaced threaded rings having alined openings therein, said regulator being fixed to a valve stem, a valve on the end of said stem, and a hand wheel for operating the regulator and unseating the valve, to permit hot or cold water through the alined openings, substantially as described.

2. In a faucet, a cylinder, inlet pipes communicating therewith, a threaded regulator fitted within said cylinder and comprising spaced rings having alined openings therein, one-half of said rings being covered by a disk or diaphragm, a valve, a stem to which said valve and regulator are connected, and means for raising and lowering said regulator and valve, substantially as described.

In testimony whereof, I affix my signature in presence of two witnesses.

ARTHUR JOHNSON.

Witnesses:
CHAS. A. JOHNSON,
GEO. P. SHEPHERD.